Aug. 28, 1962 K. B. THOMPSON 3,051,046
BINOCULARS AND OPTICAL SYSTEM THEREFOR
Filed June 16, 1958 2 Sheets-Sheet 1
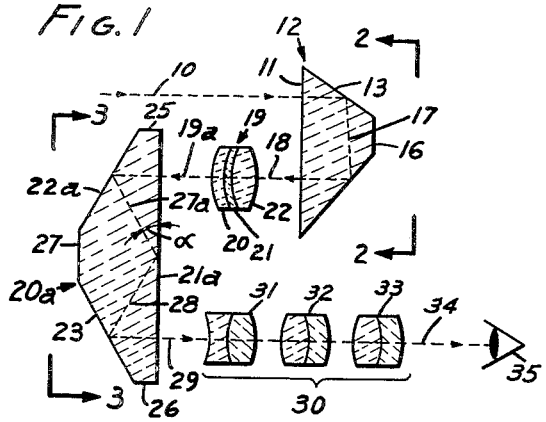
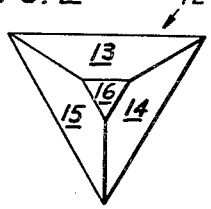
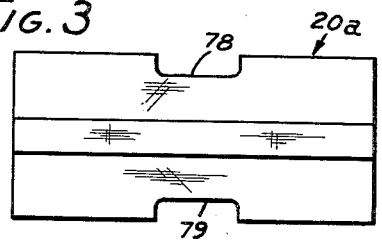
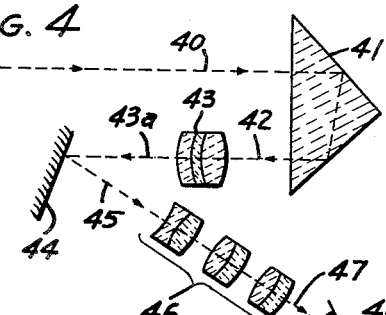
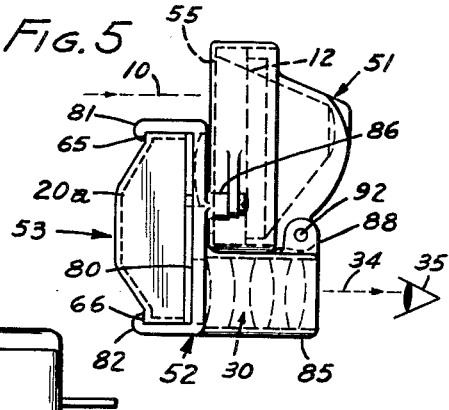
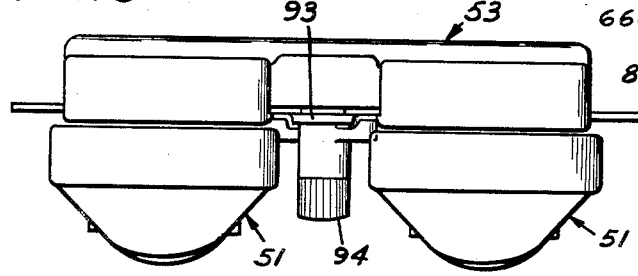
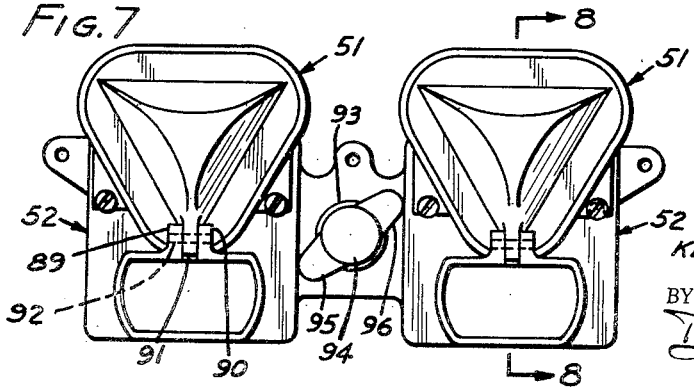
INVENTOR.
KENNETH B. THOMPSON
BY
D. Gordon Angus
ATTORNEY.

Aug. 28, 1962 K. B. THOMPSON 3,051,046
BINOCULARS AND OPTICAL SYSTEM THEREFOR
Filed June 16, 1958 2 Sheets-Sheet 2
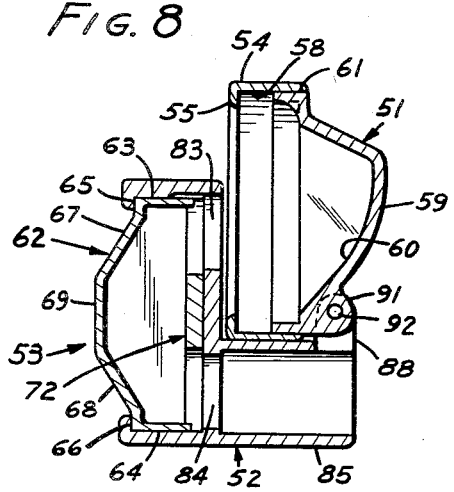
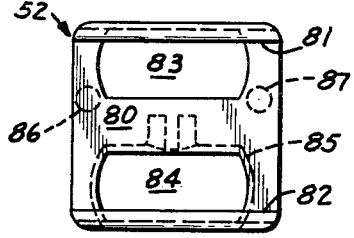
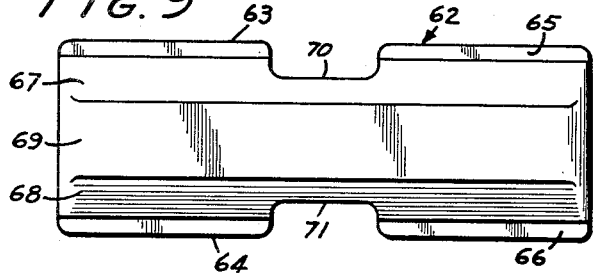
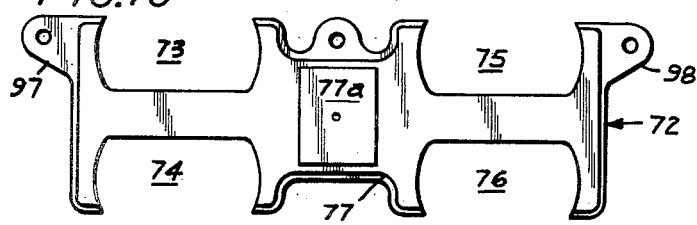
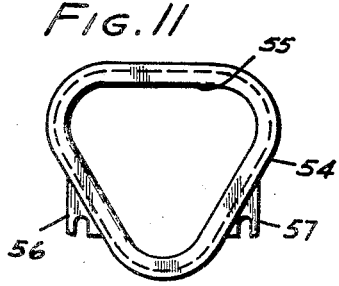
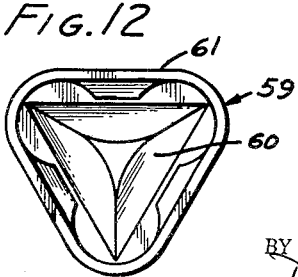
INVENTOR.
KENNETH B. THOMPSON
BY
D. Gordon Angus
ATTORNEY.

United States Patent Office 3,051,046
Patented Aug. 28, 1962

3,051,046
BINOCULARS AND OPTICAL SYSTEM THEREFOR
Kenneth B. Thompson, Sierra Madre, Calif.
(20660 W. Pine Canyon Road, Lake Hughes, Calif.)
Filed June 16, 1958, Ser. No. 742,183
6 Claims. (Cl. 88—33)

This invention relates to binoculars, and to an optical system usable in binoculars.

There are many fields of use in which it is desirable to have binoculars which provide a moderate magnification of a rather wide field. For example, applications have recently arisen wherein it is desirable for an observer in an aircraft to have a pair of binoculars which can be fitted to his helmet and thereby supported before his eyes, whereby he may see a reasonably wide field at a magnification of perhaps 3 or 4 power. It is not desirable, under such circumstances, for the binoculars or other optical system to be fixed relative to the aircraft, because when an observer is required to look through an instrument in that manner, he becomes disoriented, and often becomes ill with vertigo. For this reason, the binoculars should move with the observer, but in order to be practical, they must be quite light. It is also undesirable to provide very high magnifications, even when the binoculars move with the observer, because then the observer has difficulty in locating himself with respect to his surroundings. Particularly when the observer is an aircraft pilot, it is highly important that he retain his orientation and equilibrium while obtaining the benefits of an enlargement of the objects within the field in which he is interested. Therefore, a restriction on the power to 3x or 4x is imposed on the optical system. The above limitations on weight, field size and magnification are met by the device of this invention, and provide a solution to a present need.

Previous attempts to supply such optical systems and binoculars have invariably met with a number of problems, not the least of which is the weight of the optical elements used, much of the weight resulting from the necessity of mounting these elements in heavy, rigid structures, so that they retain their collimation and adjustment.

Accordingly, it is an object of this invention to provide a pair of binoculars, and an optical system for use therewith, which can be made light in weight, small in size, and which, when once assembled in a light-weight structure, will retain their collimation. In fact, an instrument according to this invention can be assembled and disassembled into its major sub-components and then reassembled without any further attention to collimation or adjustment.

This invention is carried out in combination with an optical system which includes retrodirective reflector, such as a cube-corner prism (which is a triple-reflection prism that reflects an incident beam in a direction 180° to the incident beam, regardless of the angle of incidence), and a deflecting reflector having the reflecting properties of a plane mirror, such as an isosceles triple-reflection prism. An objective lens is disposed in the optical path between the retrodirective reflector and the deflecting reflector, and an eyepiece for focusing the rays from the deflecting reflector is placed adjacent thereto.

According to a preferred but optional feature of the invention, the objective lens and the eyepiece in the optical system for each eye are mounted to a single unitary part of a pair of binoculars, so that they remain permanently in an adjusted and collimated position. As a consequence of this feature, and of the properties of the retrodirective and deflecting reflectors, the angular relationship of the deflecting reflector and the retrodirective reflector to the eyepiece and the objective lens is, within relatively wide limits, immaterial.

Still another preferred but optional feature of the invention resides in utilizing cube-corner prisms for the retrodirective reflectors, and mounting them so that they can be removed from the binoculars, if desired. They can then be used in rescue operations.

The above and other features of this invention will be fully understood from the following detailed description and the accompanying drawings, of which:

FIG. 1 is a side elevation in cross-section showing the relative locations of the optical elements in an optical system according to this invention;

FIGS. 2 and 3 are side views, taken at lines 2—2 and 3—3, respectively, of FIG. 1;

FIG. 4 is a side elevation partly in cut-away cross-section showing another optical system according to the invention;

FIGS. 5, 6 and 7 are end, top and side elevations, respectively, of a pair of binoculars according to this invention;

FIG. 8 is a cross-section taken at line 8—8 of FIG. 7;

FIGS. 9–13 inclusive are detailed showings of various parts of the binoculars; and FIG. 14 shows a pair of binoculars of the type illustrated in FIGS. 5–7, inclusive, mounted to the helmet of a user.

The preferred embodiment of an optical system according to this invention is shown in FIG. 1. Rays 10 represent a principal ray from an object within the field of view of the optical system and are exemplary of the rays which enter the system. These rays impinge upon a planar entrance-exit face 11 of a retrodirective reflector 12.

The retrodirective reflector, which is best shown in FIG. 2, is the well known "cube-corner" prism which has three mutually perpendicular reflecting surfaces 13, 14, 15. To be certain of reflection, these surfaces are customarily silvered. The prism is truncated by cutting off the apex of the cube-corner, thereby forming a triangular land 16. In the optical system as used, land 16 is to one side of the path of impinging rays.

The rays 10 reflect from surfaces 13, 14 and 15, in accordance with their well-known behavior, this reflection being schematically shown by the line 17 in FIG. 1. The effect of this prism is to laterally displace rays which impinge thereon and return them in a direction parallel to their impinging direction; that is, the rays 10 and the reflected rays 18 are parallel, regardless of the angle at which the rays 10 impinge upon the entrance-exit face 11. Also, an image impinging upon this type of retrodirective reflecting prism is rotated 180° for, as can be seen in FIG. 2, the closer the rays impinge to the apex of the reflector, the closer to the apex are the reflected rays, and the farther they strike from the apex, the farther they are displaced from the apex.

Therefore, the rays indicated by the numeral 18 represent a bundle of rays which are parallel to rays 10, the image being rotated 180°. Rays 18 impinge upon an objective lens 19 which may conveniently be a triplet lens comprising two concave elements 20, 21 which are cemented to each other, and a double convex element 22 cemented to element 21.

The rays 19a which depart from the objective lens next impinge upon a deflecting reflector 20a which has the deflecting (tilting) properties of a plane mirror. In the preferred embodiment of the invention shown in FIG. 1, the deflecting reflector also has the property of laterally displacing the image rays and comprises an isosceles prism in which the rays undergo an odd number of reflections, in this case, three. This isosceles prism has a planar entrance-exit face 21a and a pair of reflecting surfaces 22a, 23. These two reflecting surfaces make equal dihedral angles with the entrance-exit face 21a. Surfaces 21a, 22a and 23 are all perpendicular to the plane of FIG. 1. The dihedral angles do not intersect at a sharp edge, because in order to reduce weight and bulk of the instrument, truncating planes 25, 26 are cut at each edge of the prism perpendicular to the entrance-exit face 21a. To further lighten the weight of the optics, another truncating plane 27 is cut at the left hand side of the prism because it is outside of the optical path in this system.

Rays 19a which enter the prism are reflected from surface 22 back to the entrance-exit face 21a. The angle α which the reflected rays 27a make with the entrance-exit face 21a is less than the complement of the critical angle of total reflection, so that total reflection takes place without silvering any portion of the entrance-exit face, although the surface may be silvered in the region where reflection takes place if desired. As a result of this total reflection, rays 28 are reflected from the entrance-exit face toward reflecting surface 23. Rays 28 are reflected by surface 23 out of the deflecting reflector as rays 29. Rays 29 are received by an eyepiece system 30.

In FIG. 1 the well-known Erfle eyepiece system is shown. This system comprises three doublet lenses 31, 32, 33. Each of the doublets comprises a convex lens and a concave lens cemented together. Rays 34 pass from the eyepiece to the eye of an observer 35.

In FIG. 4, there is shown a modification of the system of FIG. 1 in which entering rays 40 impinge upon a retrodirective reflector 41, which is a prism identical to reflector 12 in FIG. 1. Rays 42 are reflected from prism 41 to and through an objective lens 43. Rays 43a depart from the objective lens, which is identical to lens 19, and impinge upon a plane mirror 44. Rays 45 are reflected from the mirror to an eyepiece system 46 which is the same as the eyepiece system 30 in FIG. 1. Rays 47 depart from the eyepiece system and impinge upon the eye of an observer 48.

The deflecting reflectors shown in FIGS. 1 and 4 have in common the fact that they have an odd number of planar reflecting mirrors, all of which are normal to a reference plane, in this case the reference plane being the planes of FIGS. 1 and 4. Light rays from the objective successively strike the reflecting surfaces, these surfaces being so disposed and arranged that the deflecting reflectors have the deflecting properties of a planar mirror. In FIG. 4 of course the number of planar reflectors is one, and the term "successively" as used in connection therewith is not to be construed to require a plurality of such surfaces, because there is only one reflection. In FIG. 1, however, the number of reflecting surfaces is three which are the significant surfaces of the isosceles prism. The distinction between the two is that the planar mirror does not displace the rays, while the isosceles prism does, both of them however deflect the ray through a total angle equal to twice the tilt of the mirror from the normal to the incident rays.

In FIG. 5, there is shown a housing structure for the optical system of FIG. 1. Rays 10 are shown entering the structure and rays 34 are shown departing from the structure to the eye of an observer 35. The assembled structure comprises three major sub-components. A first of said sub-components in a housing 51 for the retrodirective reflector 12. The second sub-component is a lens housing 52 for holding objective lens 19 and the eyepiece system 30. The third sub-component is a housing 53 for the isosceles prism 20a.

The housing 51 is shown in detail in FIGS. 8, 11 and 12. With particular reference to FIG. 8, it will be seen that the housing 51 is built in two parts. A first of said parts is a retainer 54 which is generally triangular, being rounded at its corners, and having an opening which is overhung by a rim 55. The retainer has a pair of flanges 56, 57 (see FIG. 11). Again with reference to FIG. 8, the retainer has an inner peripheral wall 58 which makes frictional engagement with a backing member 59. The backing member 59 has a three-sided cavity 60 therein (see FIG. 12) which generally matches the outer configuration of the retrodirective reflector 12. The reflector 12 need not fit tightly in the cavity, but it is preferable for it to have very little, if any, room to shift vertically in the plane of FIG. 8. The backing member has an outer wall 61 which makes a friction fit with the inner wall 58 of the retainer. As is best shown in dotted line in FIG. 5, the prism 12 is placed in the backing member and the retainer is then pressed over the backing member so that the rim 55 overhangs the prism and holds it in the housing 51.

The housing 53 for the isosceles prism comprises an enclosure member 62 (see FIGS. 8 and 9), with a pair of parallel side walls 63, 64, each of which terminates at one of its edges at an open end of the enclosure member, and at an opposite edge at a pair of tracks 65, 66. Adjacent to the tracks, there are a pair of sloping surfaces 67, 68 which intersect a flat end surface 69. The side walls and the sloping surface are modified by a pair of indentations 70, 71.

The housing 53 is closed by a cover member 72 (see FIG. 10). This cover member has four ports 73—76 for permitting the passage of rays in the optical system and is relieved at its center portion adjacent to the indentations 70, 71. As can be seen from FIG. 10, a step 77 is formed around the major part of the periphery of the cover member so that the cover member can be snapped onto the enclosure member (see FIG. 5) to be frictionally retained thereto.

The isosceles prism 20 is preferably cemented to a pad 77a on the cover member 72 as shown in FIG. 8. In order to lighten the weight of the isosceles prism, portions 78, 79 of it may be cut away at its center portion adjacent the pad. If desired, the isosceles prism could be provided in two parts which would preferably be cemented to the cover member so as to form a single integral structure, thereby eliminating the weight of the central portion of the isosceles prism. However, the additional weight of the central part of the prism is not ordinarily sufficiently great to merit the additional work of aligning two separate isosceles prisms with each other, so the single prism will ordinarily be used.

The lens housing 52 has a face 80 from which a pair of overhanging flanges 81, 82 project. As can be seen from FIG. 5, the overhanging flanges are adapted to overhang and engage tracks 65 and 66 respectively, thereby holding the face 80 against the cover member 72, and holding the housing 53 closed. The overhanging flanges are slidable along the tracks so that the interpupillary distance between the two eyepiece systems is adjustable.

The face 80 is provided with a pair of ports 83, 84 one of which is at the same elevation as the lower portion of the retrodirective reflector 12, and the other of which is disposed at an elevation below the housing 51. Adjacent to port 84 there is an eyepiece tube 85, within which the eyepiece 30 is mounted. The objective lens 19 may be cemented in or adjacent to port 83.

A pair of bosses 86, 87 are formed on the housing 52 on the opposite side from face 80 for receiving screws, the heads of which engage the flanges 56, 57, respectively, of the retainer 54. A hinge block 88 is formed at the upper outer end of the eyepiece tube 85 which has two ears 89, 90 within which a lug 91 on the backing member 59 fits. A pin 92 is passed through the ears 89, 90 and lug 91 to hold the structures together.

In order to vary the inter-pupillary distance between the pair of lens housings 52, a boss 93 is provided on the cover member 72 which mounts a rotatable cam 94 that has a pair of opposed ears 95, 96. These ears are turned by rotating cam 94. The ears bear against the lens housings, so that turning the cam clockwise in FIG. 7 moves the lens housings 52 apart and widens the interpupillary distance. The inter-pupillary distance may be narrowed simply by manually pushing the two lens housings toward each other.

Flanges 97, 98 are provided on the cover member for attachment to arms 99 (see FIG. 14) which are pivotally mounted to a helmet 100 on an observer 101 (see FIG. 14).

The operation of this optical system will now be described with particular reference to FIG. 1. Entering rays 10 impinge upon the retrodirective reflecting prism 12. These rays are reflected from prism 12 as rays 18, being invariably parallel to and oppositely directed from the entering rays 10. It will be observed that particularly with respect to rays 10, which arrive from an object at an infinite distance from the system, the retrodirective reflecting prism has not deflected these rays in any manner. Therefore, the rays 18 which strike the objective lens have the same relationship to each other (except that the bundle of rays has been rotated) as the impinging rays 10. Rays 18 pass through the objective lens. Rays departing from the objective lens enter the isosceles prism 20a at its entrance-exit face 21a, where they make three reflections, a first reflection from surface 22a, a second reflection from surface 21a by total reflection therefrom, and a third reflection from surface 23. The rays 29 which depart from the isosceles prism have been displaced laterally by the prism, and have undergone the same deflection (tilt) as would have been caused by a planar mirror. These rays enter the eyepiece system 30 and the image is formed at the eye of the observer 35.

The optical properties of the system of FIG. 4 are the same as those of FIG. 1 with the exception that rays 45 reflected from the mirror 44 are not displaced laterally but are only deflected (tilted).

The system of FIG. 4 is lighter than the system in FIG. 1, because the mirror is lighter than the isosceles prism. The system of FIG. 4 has certain specialized uses such as for intermittent observation of objects, where it is only necessary for the observer to glance up into the eyepiece to view the image. Generally speaking, the system of FIG. 1 is more suitable for constant observation, because the image is provided to the eye at its own level. It is very tiring to turn the eyes upward to view an image for any extended period of time. The requirement for raising the eye is the reason that the system of FIG. 4 is principally useful for intermittent observation.

This invention provides several advantages over other optical systems which are suitable for use in binoculars. One of said advantages is that the optical system is substantially insensitive to displacement or tilting of either the retrodirective reflective prism 12 or the isosceles prism 20 or mirror 44. This is due to the fact that the lens systems, that is the objective lens and the eyepiece systems, are collimated at the time they are attached to housing 52. After this initial collimation, there will be no further change between the alignment of these two lens systems.

It will be noted that the rays 18 which are reflected from the retrodirective reflector 12 are parallel. This parallelism is independent of the position of the prism 12. Within wide limits, say 5°, the retrodirective reflector may be freely tilted, and it may also be shifted vertically in FIG. 1 without having any effect whatever upon the parallelism of the entering rays 10 and the reflecting rays 18, although the rays may be shifted laterally somewhat. However, the collimation of the lens system is not affected by any movement of the reflector 12, because that reflector continues to provide only rays to the objective lens that are parallel to entering rays 10. This degree of freedom in the mounting and movement of the prism 12 does not exist in the system shown in Thompson Patent No. 2,710,560, because in that patent the objective lens is ahead of the retrodirective reflecting prism, and the prism then operates on converging rays. It is well known that displacement of converging rays destroys collimation of lens systems. For this reason, it was necessary to exercise care in the mounting of the retrodirective reflecting prism in that system, while in the present invention, the retrodirective reflecting prism 12 can actually rattle around, within rather wide limits, with no effect on collimation.

Another advantage resides in the freedom from tilt effects in the deflecting reflector. This reflector has the tilting property of a plane mirror, and in this device, the isosceles prism or the mirror may be tilted around at will (of course within system limitations). Because the tilt will be the same for both telescope systems, the collimation of the device as a whole is not effected.

Furthermore, the displacement of the deflecting reflector is constant. The displacement by planar mirror is of course zero, and the displacement in other systems of odd numbers of reflections depends upon the physical dimensions of the reflector. It is independent of the lateral movement of the reflector, so that after the one-time collimation of the two lens systems (objective and eyepiece) the collimation is not affected by tilt or displacement of the deflecting reflector.

It will be observed therefore that the relationships of the reflectors to the objective lens or to the eyepiece are not critical, and that the only critical adjustment in the system involves collimation between the objective lens and the eyepiece, which is easily performed, and once performed is maintained in the structure shown.

It will now be appreciated that the above freedom from critical adjustments of the reflectors enables an inexpensive binocular system to be made which does not need strong and rigid construction in order to maintain the device in collimation. On the contrary, only a fairly stout but light housing 52 is needed. As can be seen, the distance between the eyepiece and the objective lens may be made quite small so that the structure itself need not be heavy in weight or large in cross section.

This device offers an advantage in rescue work, for by removing the screws and the pin 92, it is possible to pull housing 51 off the structure and be able to freely handle the retrodirectively reflecting prism. The property of this prism to return the light to its source regardless of the direction of incidence is an important factor in its utility in rescue operations. A search airplane need only flash a searchlight over a wide area, and a person on the surface need only face the exit-entrance surface of the prism in the general direction of the searchlight. The rays from the searchlight which are incident on the reflector are then reflected to the airplane even though the exit-entrance surface may not be normal to the line between the airplane and the entrance-exit face. After the use of a prism as a rescue aid is concluded, the device may simply be reassembled by again placing the housing 51 against housing 53 reinserting the pin 92 and tightening down on the screws.

It will be appreciated that this invention provides a simple, binocular system which produces moderate magnification with a large field. It may be made quite light in weight, and small in size. It also has an advantage in receiving the rays from a level above the eyes of the observer, so that in certain aircraft cockpits in which the windshield is a very narrow slit at a high elevation, it provides a periscope for the pilot.

The deflecting reflector may have a number of reflections greater than three, if desired, the limitation being that the number must be odd.

This invention is not to be limited by the embodiments shown in the drawings and described in the description, which are given by way of example and not of limitation, but only in accordance with the scope of the appended claims.

I claim:

1. A binocular comprising: an enclosure member havtwo sides, one of said sides being open and one of said sides being closed, a pair of tracks at the closed side of said housing, a cover member for closing the said open side, said cover member having four apertures therein which are spaced from each other, said apertures being provided in pairs, the members of each pair being spaced one above the other, a pair of lens housings, each comprising a face adapted to bear against said cover member, a pair of overhanging flanges adapted to engage said tracks, so as to hold the cover member against the enclosure member, and two apertures which are generally aligned with a respective pair of apertures on the cover member when the lens housing engages the enclosure member, a retainer having a generally triangular configuration defining an opening, a rim overhanging a part of said opening, a backing member having a cavity therein, said backing member being adapted to be engaged by said retainer, said retainer and backing member being adapted to be mounted to each lens housing, a retrodirective reflector held in each said backing member by the said retainer, a deflecting reflector facing the apertures and including an odd number of planar reflecting surfaces which are all normal to a reference plane and which are successively impinged upon by the light rays from the field of view, said reflecting surfaces being so disposed and arranged that the deflecting reflector has the angular deflecting properties of a planar mirror, an objective lens in one of the apertures of each of the lens housings between the deflecting reflector and the retrodirective reflector, and an eyepiece system disposed in each of the other apertures in the lens housing facing the deflecting reflector.

2. Apparatus according to claim 1 in which each lens housing is provided with a tubular structure adjacent of its apertures for accommodating the eyepiece system.

3. Apparatus according to claim 2 in which each retrodirective reflector comprises a cube-corner prism having an entrance-exit face, a part of said entrance-exit face being exposed to light rays from the field of view, and the other part of said entrance-exit face being exposed to the objective lens, the deflecting reflector comprising an isosceles prism which includes an entrance-exit face and a pair of reflecting surfaces which make equal dihedral angles with the entrance-exit face, said entrance-exit face and two reflecting surfaces all being perpendicular to the same plane, one of said reflecting surfaces facing the objective lens and the other of said reflecting surfaces facing the eyepiece.

4. Apparatus according to claim 3 in which the isosceles prism is attached to the cover member.

5. Apparatus according to claim 4 in which the isosceles prism is attached to the cover member and in which the overhanging flanges are adapted to engage the tracks to permit relative sidewise movement between the lens housing and thereby to allow for an adjustment of the inter-pupillary spacing of the binoculars.

6. Apparatus according to claim 5 in which the isosceles prism comprises one unitary prism which extends in front of both apertures of each lens housing.

References Cited in the file of this patent

UNITED STATES PATENTS

| 754,076 | Konig | Mar. 8, 1904 |
| 2,710,560 | Thompson | June 14, 1955 |

FOREIGN PATENTS

| 312,315 | Germany | Oct. 7, 1919 |